United States Patent [19]

Sakata

[11] Patent Number: 5,937,407
[45] Date of Patent: Aug. 10, 1999

[54] INFORMATION RETRIEVAL APPARATUS USING A HIERARCHICAL STRUCTURE OF SCHEMA

[75] Inventor: Tsuyoshi Sakata, Yokohama, Japan

[73] Assignee: Digital Vision Laboratories Corporation, Japan

[21] Appl. No.: 08/989,206

[22] Filed: Dec. 11, 1997

[30] Foreign Application Priority Data

Dec. 12, 1996 [JP] Japan ................................. 8-332279

[51] Int. Cl.$^6$ .................................................. G06F 17/30
[52] U.S. Cl. ................................ 707/100; 707/3; 707/4; 707/101; 707/102
[58] Field of Search ......................... 707/1–3, 100–103; 706/45, 46, 50, 55, 902, 934

[56] References Cited

U.S. PATENT DOCUMENTS

| 5,339,256 | 8/1994 | Levy et al. ............................. 706/911 |
| 5,768,578 | 6/1998 | Kirk et al. ............................. 707/100 |
| 5,778,373 | 7/1998 | Levy et al. ............................. 707/100 |
| 5,826,258 | 10/1998 | Gupta et al. ............................. 707/4 |

OTHER PUBLICATIONS

Microsoft Press Computer Dictionary, Second Edition, 1994, pp. 156–157, 344–345, Dec. 1994.

*Primary Examiner*—Thomas G. Black
*Assistant Examiner*—Hosain T. Alam
*Attorney, Agent, or Firm*—Christensen O'Connor Johnson & Kindness PLLC

[57] ABSTRACT

An information retrieving apparatus comprises a retrieve instruction executing means for executing a retrieve instruction based on a retrieval formula described based on an arbitrary schema, a schema conversion means for converting the retrieval formula into another retrieval formula according to another schema based on pregiven rules, and a schema management means for managing the rules for converting the retrieval formula into the other retrieval formula, wherein the retrieve instruction executing means retrieves desired information based on the other retrieval formula. In this case, preferred embodiments are as follows.

8 Claims, 4 Drawing Sheets

INFORMATION RETRIEVAL APPARATUS USING A HIERARCHICAL STRUCTURE OF SCHEMA

BACKGROUND OF THE INVENTION

The present invention relates to an information retrieving apparatus such as commodity information which has been built into databases in various formats for description and, more particularly, to an information retrieving apparatus on various commodities provided by different providers on a communication basis, e.g., over the Internet.

Recently, selling by correspondence utilizing virtual shopping malls or shopping pages provided over computer communication or the Internet has been holding the spotlight.

However, consumers who purchase commodities through such shopping malls or shopping pages have problems such as inability to find commodities that they are looking for. Providers who provide commodities have a problem that their customers do not visit their shops (or the customers do not access their home pages). The term "commodities" implies here not only material commodities but also immaterial commodities. For example, in the case of a commodity provider who is a broadcaster, the commodity is services such as programs that it broadcasts.

Among the above-described problems, the inability to find commodities as a problem at the consumers' side refers to situations as described below.

It refers to a situation wherein one can not find a program that broadcasts a piece of music he or she wishes to listen to from among programs for broadcast or a situation wherein one can not find a movie film that he or she wishes to watch to see a certain actor performing because a program table shows only general information. It further refers to such a situation that one can not find a home page that sells a certain commodity that he or she looks for over the Internet.

From the providers' point of view, referring to current retrieval services in the Internet as an example, there is a problem in that a new WWW (World Wide Web) site opened on the Internet can not be found by consumers because the services employ a system in which commodities are accessed from the consumers' side.

Conventional retrieval services in the Internet will now be specifically examined.

When a user searches information on the WWW, in general, the user retrieves information by passing keywords for retrieval services to, for example, a retrieval engine or the like. However, since such retrieval services handle an enormous number of WWW pages, too many results of retrieval can be provided or irrelevant pages can be returned unless the keywords are specified properly. This is significant especially in the case of retrieval of commodities for on-line shopping.

For example, let us assume here that pages of on-line shopping on the WWW are searched in an attempt to purchase a red polo shirt from a certain manufacturer. Then, the user carries out retrieval by specifying "polo shirt", "manufacturer name" and "red" as keywords, but results of retrieval are returned including many irrelevant pages such as a page that introduces jeans from the relevant manufacturer and polo shirts from other manufactures and an essay on polo shirts from Ralph Lauren which is irrelevant to the intention of the user to purchase.

On the contrary, retrieval using keywords provided by retrieval services searches only WWW pages including keywords that coincide with the input, and it is not necessarily possible to find pages which seem to be relevant. Specifically, as shown in FIG. 1, retrieval in search of a commodity named "Blade Runner" can return only data which conform to all of keywords "commodity name" and "Blade Runner" as a result of retrieval (only the data indicated by the solid line in FIG. 1). Therefore, the WWW pages including information "Title: Blade Runner" or "Title in Japanese: Blade Runner" indicated by the dotted lines in FIG. 1 can not be obtained as a result of retrieval. Thus, it is not necessarily possible to retrieve desired information using keywords.

As described above, since current retrieval of commodities is carried out on a full test basis, there are problems in that a result of retrieval can include many irrelevant things and in that a desired commodity can not be found.

The above-described problems result from a fact that keywords to be retrieved are associated with pages instead of commodities and a fact that keywords are extracted from words that appear on pages and therefore the intentions of information providers that are not written on the pages (e.g., whether the pages are intended for selling or introduction) are not the object of retrieval. In order to solve such problems and to allow a user to utilize retrieval services intuitively, it is desirable to perform retrieval based on the features of commodities registered by information providers instead of keywords that are automatically extracted.

BRIEF SUMMARY OF THE INVENTION

It is an object of the invention to provide an information retrieving apparatus which allows consumers to retrieve desired commodity information quickly and easily and consequently allows providers to present consumers with commodities that they can provide to consumers without special efforts.

The present invention includes means as described below provided to solve the above-described problems.

An information retrieving apparatus according to as aspect of the invention comprises a retrieve instruction executing means for executing a retrieve instruction based on a retrieval formula described based on an arbitrary schema; a schema conversion means for converting the retrieval formula into another retrieval formula according to another schema based on pregiven rules; and a schema management means for managing the rules for converting the retrieval formula into the other retrieval formula, wherein the retrieve instruction executing means retrieves desired information based on the other retrieval formula. In this case, preferred embodiments are as follows.

(1) The apparatus further comprises a data base for storing retrieval object information, in which the retrieval object information consists of a pair of attribute data and a value.

(2) The retrieve instruction executing means retrieves desired information based on the retrieval formula and the other retrieval formula.

(3) The schema management means manages attribute information of at least one schema using a hierarchical structure.

(4) when the retrieval by the retrieve instruction executing means does not provide the desired information, the schema conversion means converts the layer of the attribute information into the layer above it and wherein the retrieve instruction executing means executes retrieval based on the result of the conversion.

(5) The retrieve instruction executing means retrieves information stored in at least one database connected through a network.

An information retrieving apparatus according to another aspect of the invention comprises a meta-data storage section for storing meta-data stored in various formats; a schema declaration section for extracting a schema associated with meta-data for each of predetermined items of information from meta-data stored in the meta-data storing section to define a method of describing attributes; and a relation declaration section for defining a hierarchical relation between the attributes defined by the schema declaration section and attributes of other schemata. With this configuration, the apparatus further comprises a core attribute hierarchy declaration section in which a general hierarchical relation between attributes is described.

According to the present invention, retrieval is carried out after performing a conversion into a desired schema using schema hierarchy constituted by layers between which each attribute is related. As a result, unnecessary information will not be retrieved, and desired commodity information can be quickly and easily retrieved even if the required information is ambiguously specified.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

An embodiment of the present invention will now be described with reference to the accompanying drawings.

Figure 1:
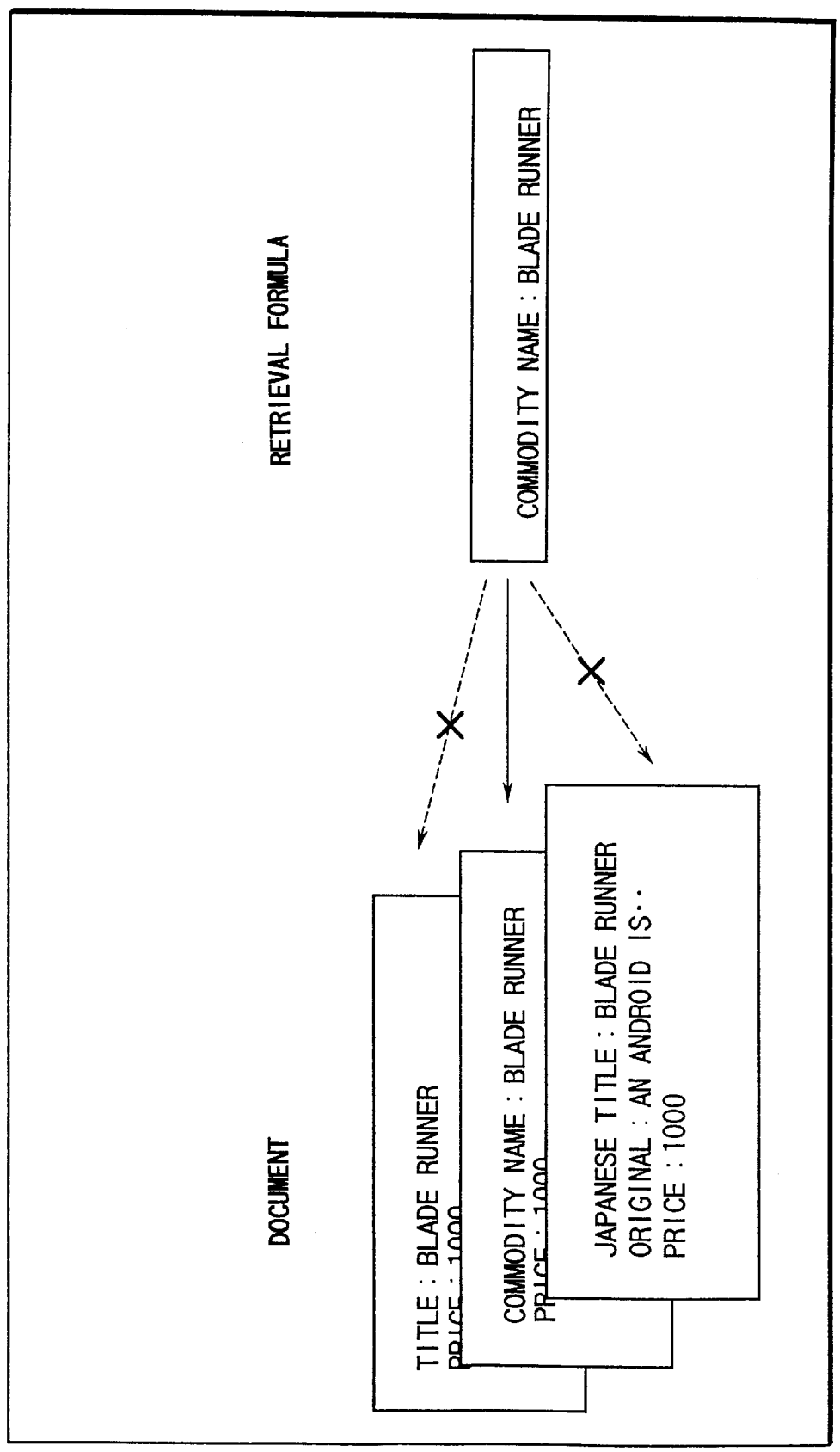
FIG. 1 illustrates an example of retrieval using keywords according to the prior art.
Figure 2:
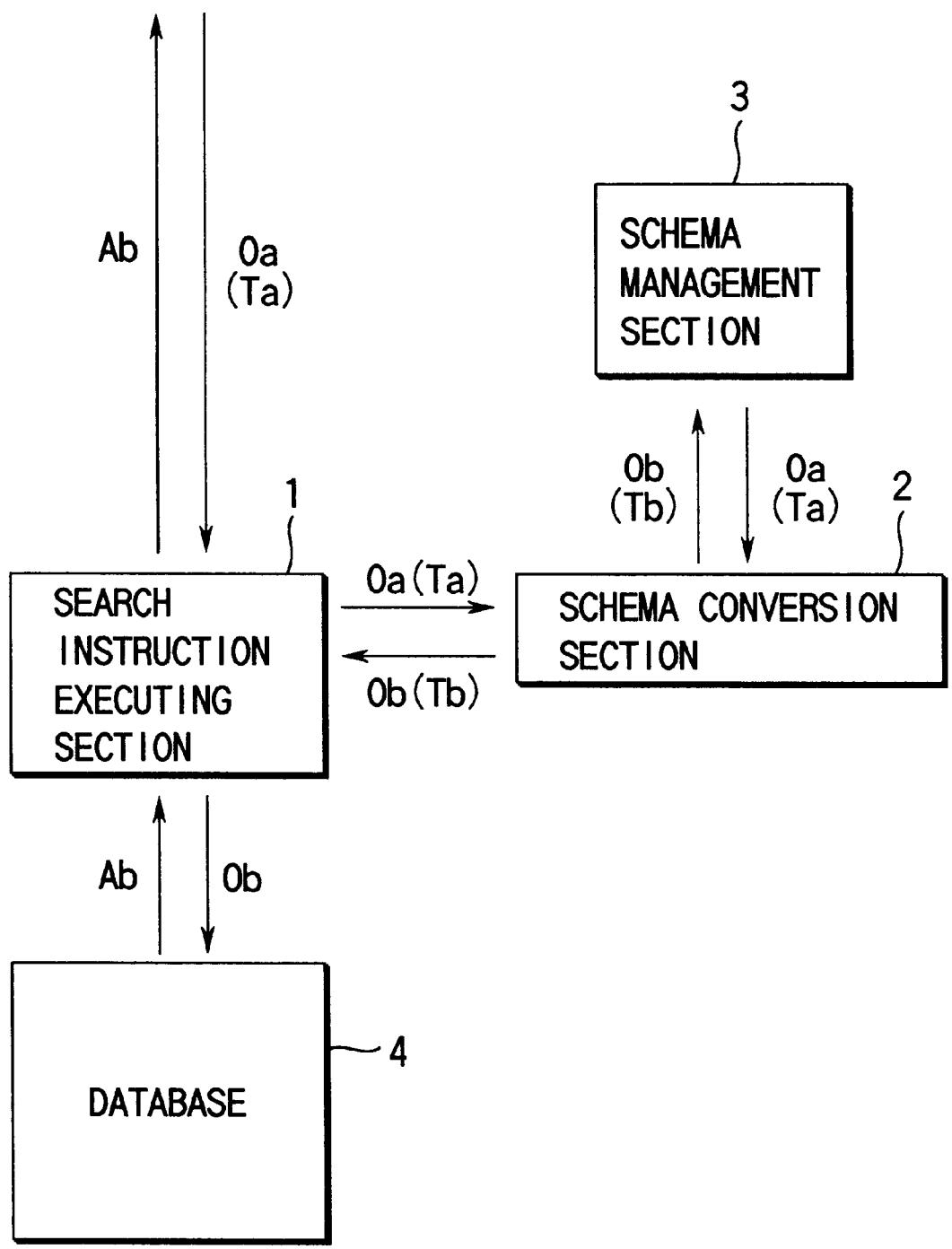
FIG. 2 shows a schematic configuration of a retrieving apparatus according to an embodiment of the invention.

FIG. 2 shows a schematic configuration of a retrieving apparatus according to an embodiment of the invention.

The retrieving apparatus according to the invention comprises a retrieve instruction executing section 1, a schema conversion section 2 and a schema management section 3. Referring to FIG. 2, a database 4 stores information and, for example, it may be a WWW site on the Internet or a database in the intranet.

The retrieve instruction executing section 1 retrieves desired data from the database 4 in response to a retrieve instruction.

The schema conversion section 2 converts a retrieve instruction input to the retrieve instruction executing section 1 into a retrieve instruction which makes it possible to obtain the desired information.

The schema management section 3 manages association of a predetermined schema with another schema. Such association of schemata will be detailed later.

The term "schema" refers to a list of attributes used for indicating an object, when an information is referred as a set of an attribute and a value. For example, when a commodity is referred by three attributes of a commodity name, price and manufacturer name, a schema indicating the commodity information is consist of those attributes.

Figure 3A:
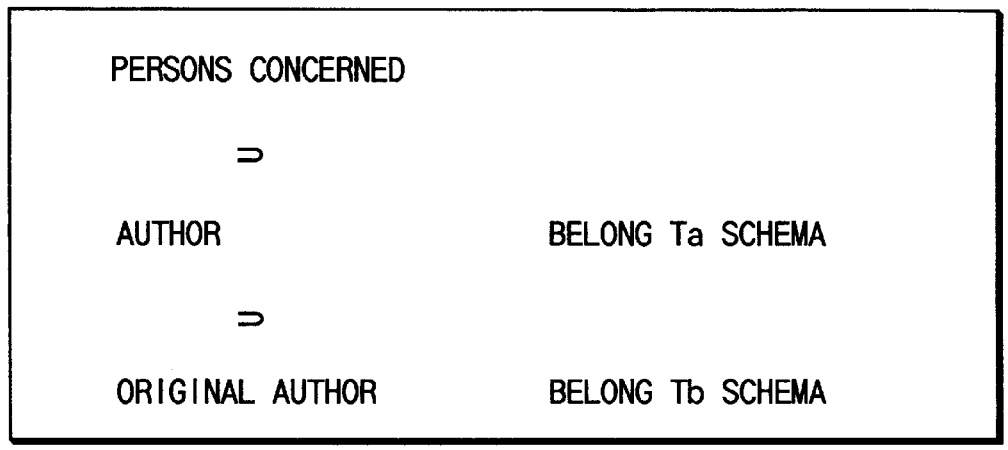
FIGS. 3A and 3B illustrate operations of the retrieving apparatus according to the embodiment of the invention.
Figure 3B:
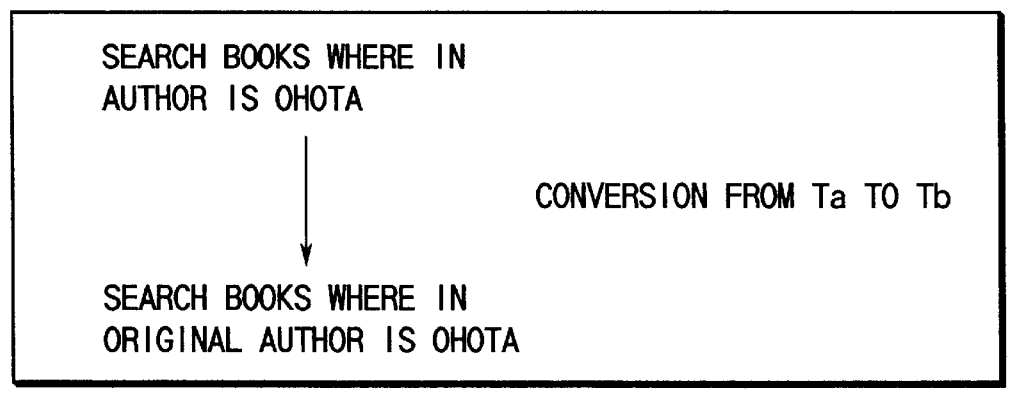

Operations of the retrieving apparatus according to the present embodiment of the invention will be described with reference to FIGS. 2, 3A and 3B. As shown in FIG. 3A, a possible value range of an attribute "persons concerned" includes a possible value range of an attributes "author" belonging to a schema Ta, and a possible value range of an attributes "author" includes a possible value range of an attributes "original author" belonging to a schema Tb. That is, a schema including the attribute "persons concerned" includes a schema including the attributes "author" and "original author", and a schema including the attribute "author" includes a schema including the attributes "original author". Therefore, when the schema including the attribute "author" is retrieved, the schema including the attribute "original author" is also retrieved.

First, the retrieve instruction executing section 1 receives a retrieve instruction Oa based on a schema Ta including the attribute "author". Since a retrieve instruction Oa includes a n identifier that indicates a schema (e.g., a symbol A, B or the like) that precedes the attribute, it is known based on what schema an item of meta-data is stored in a database. Meta-data are information representing the meaning of an object (e.g., commodity) and are data that include the attribute and attribute value thereof (e.g., the attribute may be "price" and the attribute value may be the actual price). Then, the retrieve instruction executing section 1 knows from the retrieve instruction Oa that an object to be retrieved (e.g., one including the attribute "original author) is based on, for example, a schema Tb and it therefore instructs the schema conversion section 2 to change the retrieve instruction Oa such that it will be based on the schema Tb.

Based on the instruction from the retrieve instruction executing portion 1, the schema conversion section 2 inquires of the schema management section 3 whether the schema Tb includes attributes that correspond to attributes Gi belonging to the schema Ta that forms the retrieve instruction Oa.

When the inquiry tells that there are corresponding attribute, the schema conversion section 1 carries out attribute conversion until all of the attributes included in the schema Ta are converted into desired attributes and outputs a retrieve instruction Ob based on the schema Tb when the conversion is completed for all of the attributes of the retrieve instruction Oa. In this case, for example, a retrieve instruction Oa "search books wherein author is Ohota" is converted into a retrieve instruction Ob including a retrieve instruction "search books wherein original author is Ohota", as shown in FIG. 3B.

The retrieve instruction executing section 1 retrieves information in the database 4 based on the new retrieve instruction Ob input from the schema conversion section 2 and outputs a result Ab.

As described above, according to the present embodiment, a retrieve instruction input to the retrieve instruction executing section 1 is converted by the schema conversion section 2 such that it can be effectively retrieved. Thus, desired information can be retrieved without any omission.

While retrieval is carried out by converting a schema Ta into another schema Tb in the above-described embodiment, the present invention is not limited thereto and a result of retrieval Aa can be obtained based on the schema Ta as it is. Further, the schema Tb may include the schema Ta to provide both of the results of retrieval Aa and Ab.

When retrieval as described above does not provide the desired information, the attribute information included in the schema can be retrieved as information in the layer immediately above the current layer. In this case, the retrieve instruction Oa "search books wherein author is Ohota" becomes a retrieve instruction "search books wherein person concerned is Ohota" which causes retrieval of information in all layers below "person concerned".

Figure 4:
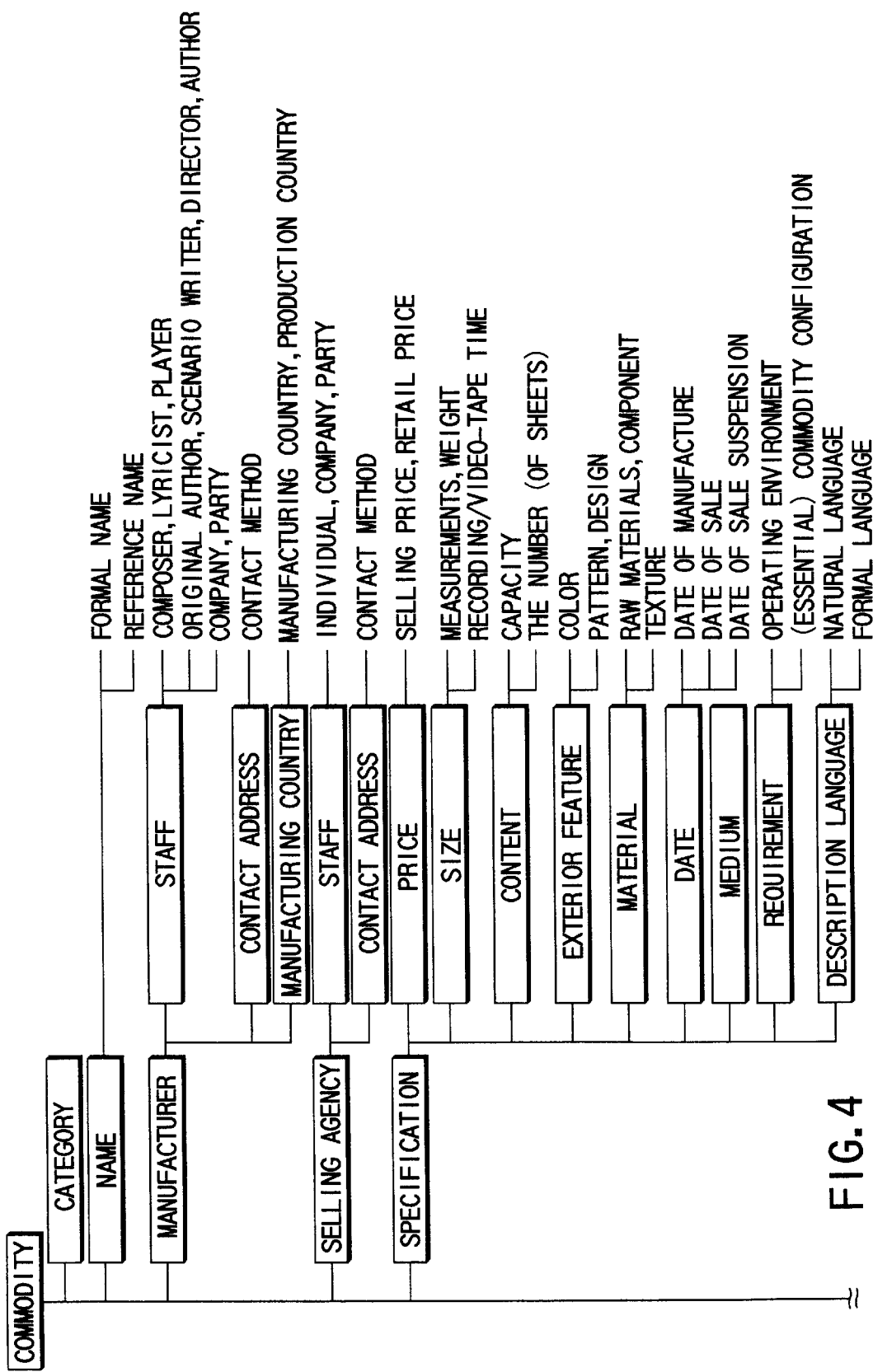
FIG. 4 illustrates an example of data (meta-data) included in a schema management section 3.

FIG. 4 shows an example of a hierarchy of the attributes included in the schema management section 3.

Referring to FIG. 4, attributes form a hierarchy wherein "commodity" is in the highest place; category, name, and manufacturer are placed in the layer below it; and staff and contact address and the like follows in the layer below it.

Figure 5:
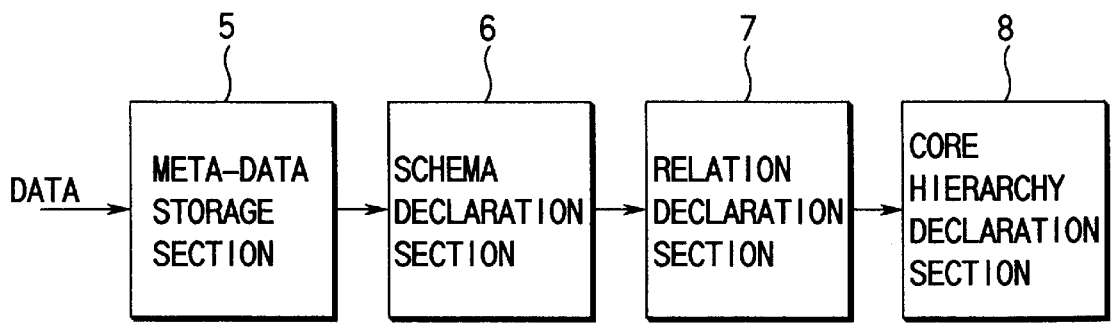
FIG. 5 shows a schematic configuration of an apparatus for creating the meta data shown in FIG. 4.

FIG. 5 shows an apparatus for creating meta-data shown FIG. 4. The apparatus shown in FIG. 5 comprises a meta-data storage section 5, a schema declaration section 6, a relation declaration section 7 and a core hierarchy declaration section 8.

An representative attribute is declared in a form of hierarchy by the core hierarchy declaration section 8. When a new schema is produced, after producing the schema declaration section 6, the relation declaration section 7 can declare if an attribute defined in the schema declaration section 6 has any inclusive relationship between attributes of other schemas or attributes in the core hierarchy declaration section 8.

Information stored in various formats and having characteristics of, for example, an image file, an HTML document or the like is stored in the meta-data storage section 5 as meta-data.

The data stored in the meta-data storage section 5 are created in accordance with a method of describing attributes used for description in the schema declaration section 6.

Then, the relation declaration section 7 defines hierarchical (vertical) relationship between attributes based on the method of describing attributes defined by the schema declaration section 6, and the relationship is stored in the core hierarchy declaration section 8.

The formation of such an hierarchy of attributes as described above makes it possible to retrieve meta-data based on different schemata as described in the above embodiment.

While the retrieving apparatus and data creating apparatus in the above embodiment have been described as separate apparatuses, the data creating apparatus may function as a part of the retrieving apparatus.

The present invention is not limited to the above-described embodiment and it is obvious that various modifications are possible without any alteration to the principle of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. An information retrieving apparatus comprising:
   a meta-data storage section for storing meta-data stored in various formats;
   a schema declaration section for extracting a schema associated with meta-data for each of predetermined items of information from meta-data stored in said meta-data storing section to define a method of describing attributes;
   a relation declaration section for defining a hierarchical relation between the attributes defined by said schema declaration section and attributes of other schemata;
   a retrieve instruction executing means for executing a retrieve instruction based on a retrieval formula described based on an arbitrary schema;
   a schema conversion means for converting said retrieval formula into another retrieval formula according to another schema based on said hierarchical relation defined by said relation declaration section;
   a schema management means for managing said hierarchical relation for converting said retrieval formula into said other retrieval formula; and
   a data base for storing retrieval object information consisting of a pair of attribute data and a value, wherein said retrieve instruction executing means retrieves desired information based on said other retrieval formula.

2. The information retrieving apparatus according to claim 1, wherein said retrieve instruction executing means retrieves desired information based on said retrieval formula and said other retrieval formula.

3. The information retrieving apparatus according to claim 1, wherein said schema management means manages attribute information of at least one schema using a hierarchical structure.

4. The information retrieving apparatus according to claim 1, wherein when the retrieval by said retrieve instruction executing means does not provide the desired information, said schema conversion means converts the layer of said attribute information into the layer above it and wherein said retrieve instruction executing means executes retrieval based on the result of said conversion.

5. The information retrieving apparatus according to claim 1, wherein said retrieve instruction executing means retrieves information stored in at least one database connected through a network.

6. The information retrieving apparatus according to claim 1, wherein said retrieve instruction executing means includes means for judging whether or not a desired information can be retrieved based on the retrieval formula described based on the arbitrary schema.

7. An information retrieving apparatus comprising:

a meta-data storage section for storing meta-data stored in various formats;

a schema declaration section for extracting a schema associated with meta-data for each of predetermined items of information from meta-data stored in said meta-data storing section to define a method of describing attributes; and a relation declaration section for defining a hierarchical relation between the attributes defined by said schema declaration section and attributes of other schemata.

8. The information retrieving apparatus according to claim 7, further comprising a core attribute hierarchy declaration section in which a general hierarchical relation between attributes is described.

* * * * *